United States Patent [19]
Wieder

[11] Patent Number: 5,132,492
[45] Date of Patent: Jul. 21, 1992

[54] LIMITED TRAVEL UNIVERSALLY ADJUSTABLE ELECTRICAL FIXTURE

[75] Inventor: Klaus Wieder, Helenville, Wis.

[73] Assignee: Heath Company, Benton Harbor, Mich.

[21] Appl. No.: 696,387

[22] Filed: May 6, 1991

[51] Int. Cl.$^5$ .............................................. H02G 3/04
[52] U.S. Cl. .................................. 174/65 R; 362/421; 403/122
[58] Field of Search ............... 439/6, 8; 362/285, 287, 362/372, 418, 421; 361/331, 334, 356; 285/907; 403/122, 74, 113; 174/54, 57, 65 R

[56] References Cited

U.S. PATENT DOCUMENTS

| | | | |
|---|---|---|---|
| 3,778,610 | 12/1973 | Wolf | 174/86 |
| 4,333,132 | 6/1982 | Paley | 362/421 |
| 4,357,651 | 11/1982 | Mayer | 362/421 |
| 4,521,836 | 6/1985 | Puttemanns | 362/145 |
| 4,700,017 | 10/1987 | Morand | 174/86 |
| 4,856,825 | 8/1989 | Blakely | 285/175 |

Primary Examiner—Gerald P. Tolin
Attorney, Agent, or Firm—Dillis V. Allen

[57] ABSTRACT

A universally movable electrical fixture having a ball carrying base and cooperating electrical fitting carried socket with a unique tab projection that rides in a circumferential slot in the ball shaped to permit free swinging movement of the electrical fixture while limiting the rotational movement of the fixture to about 130 degrees to minimize electrical conductor twisting.

5 Claims, 5 Drawing Sheets

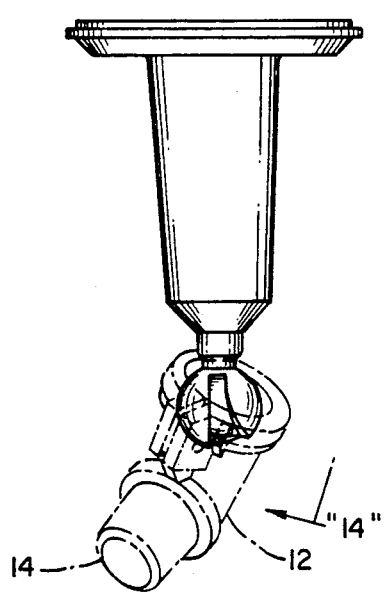
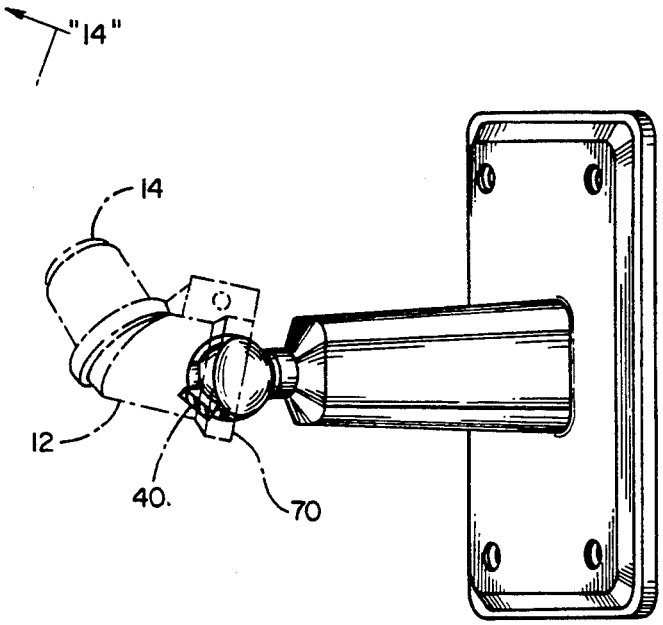
Fig. 13  Fig. 14
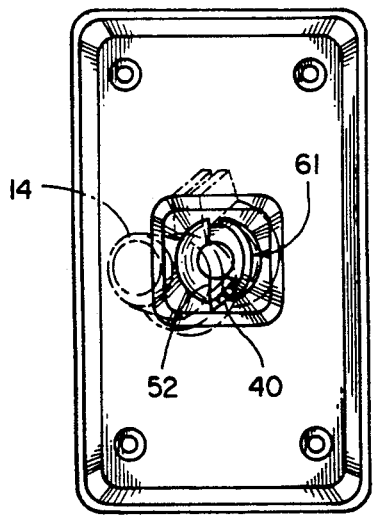
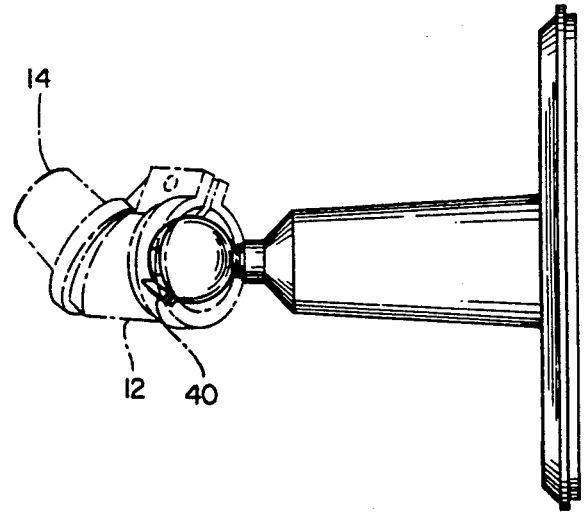
Fig. 15  Fig. 16

LIMITED TRAVEL UNIVERSALLY ADJUSTABLE ELECTRICAL FIXTURE

BACKGROUND OF THE INVENTION

Universal connectors have in the past been widely used to provide universal adjustment for electrical devices and most notably lamp fixtures, although the principles of the present invention can be applied to electrical fixtures other than lamps.

These devices generally include a base, an electrical fixture, and a universal joint, usually a ball and socket arrangement interconnecting the base and the fixture so that the base, when mounted in a stationary position, permits the fixture to be manually moved in any desired position within the limits imposed by the support for the base carried ball.

The fixture of course requires electrical power provided by a flexible sheath conductor and the conductor can either be external, not passing through the base but instead going directly to an electrical outlet, or can be internal running concealed through the fixture, through an opening in the ball, and through a hole in the base to a source of power.

In this latter arrangement there is a significant problem of conductor twisting, fatigue and failure that results from the user repeatedly or excessively twisting the fixture on the base about its own axis.

It is a primary object of the present invention to ameliorate the problem noted above in universal joints for electrical devices.

SUMMARY OF THE PRESENT INVENTION

In accordance with the present invention a conductor receiving ball and socket connection is provided for a universally movable electrical device that limits movement of a movable fixture fitting about its own axis to about 180 degrees while permitting free swinging movement in all other directions within the limits imposed by the support for the ball.

Toward these ends and according to the present invention, the base is provided with a integral spherical ball on a small diameter stand-off that increases the fixture fitting's range of swinging movement. A one-piece fixture fitting has a semi-spherical socket that mates with the ball and both the ball and the socket have holes through which the electrical conductor for power supply passes to the electrical device or lamp attached to the fixture fitting.

A uniquely shaped generally circumferential slot in the ball engages a socket projecting tab to prevent rotation of the fixture about its own axis in all but a single position where in that position rotation of the fixture about its own axis is limited to about 180 degrees.

The slot has a first side that extends generally axially on the ball and a second side that extends cordally on the ball and angularly related to the first side so that the slot is widest at the electrical conductor opening in the end of the ball. When the tab is in this wide portion of the slot in certain positions, 180 degree rotation of the fixture is permitted.

The two ends of the slot flanking this widest portion are narrower and tapered so that the slot sides are closest at the ends of the slot near the base of the ball, and these narrow portions almost completely prevent rotation of the fixture about its own axis but still permits free swinging motion of the fixture. One slot end controls fixture movement above a horizontal plane extending through the ball and the other end controls movement below that horizontal plane.

Other objects and advantages of the present invention will appear more clearly from the following detailed description.

BREIF DESCRIPTION OF THE DRAWINGS

Figure 7:
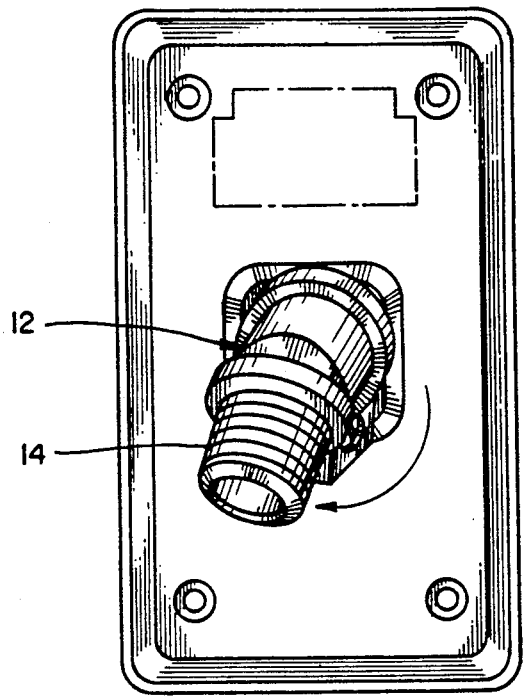
FIGS. 7 and 8 are front views of the universal fixture according to the present invention with the fixture fitting in its predetermined positions respectively below and above a horizontal plane extending through the ball where the fixture may be rotated about 130 degrees about its own axis from its position shown in FIG. 7 to its position shown FIG. 8.
Figure 8:
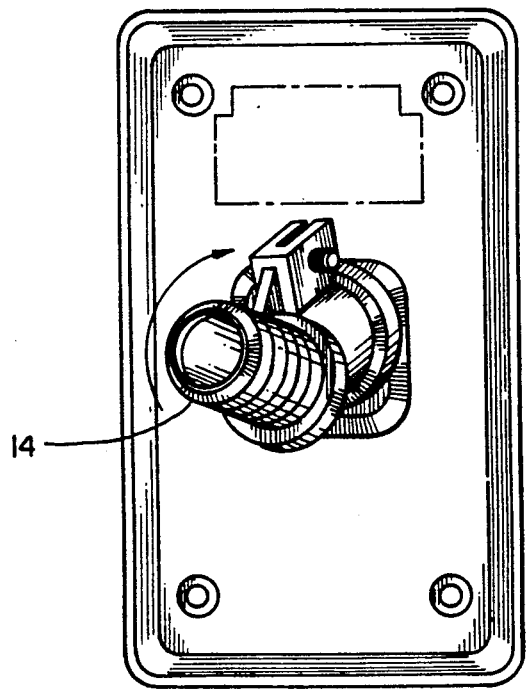
Figure 9:
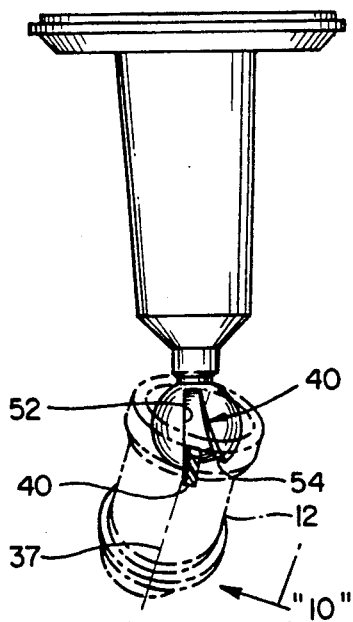
Figure 10:
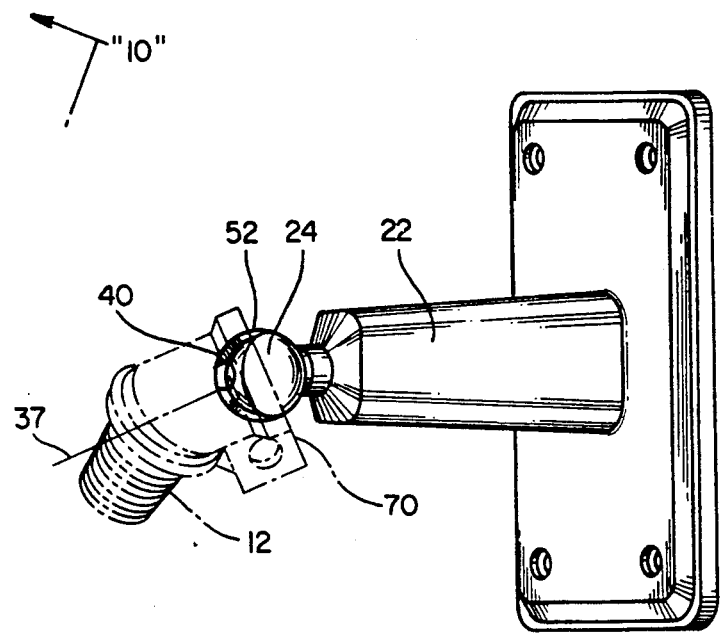
Figure 11:
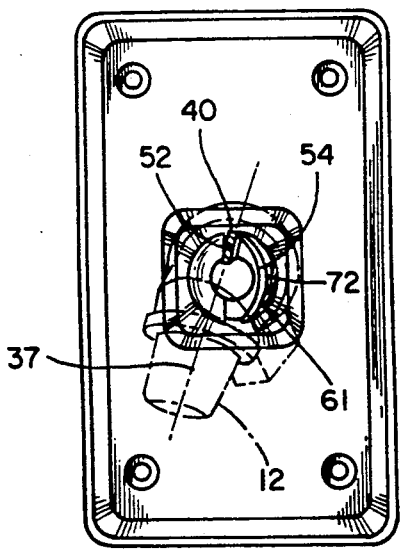
Figure 12:
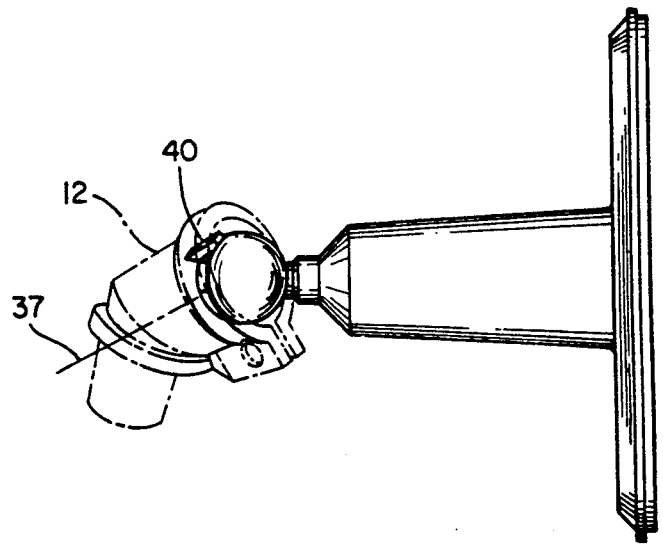

FIGS. 9 and 12 are views of the fixture in the position of FIG. 7 with the fixture fitting shown in dotted lines and the socket tab illustrated fragmented to more clearly show its position with respect to the ball slot; with FIG. 9 being a top view, FIG. 10 being an angular side view taken generally along line 10—10 of FIG. 9, taken on a line perpendicular to the axis of the cylindrical fitting portion surrounding the spherical socket in the fitting, FIG. 11 is a front view of the fixture illustrated in FIGS. 9 and 10, and FIG. 12 is a right side view of the fixture illustrated in FIGS. 9 to 11, and;

FIGS. 13 to 16 are views of the fixture according to the present invention in the position illustrated in FIG. 8 and shown in the same corresponding views for the position of the fixture in FIGS. 9 to 12; with FIG. 13 being a top view, FIG. 14 being an angular side view taken generally along line 14—14 of FIG. 13 on a line perpendicular to the cylindrical portion of the fixture fitting surrounding the spherical socket, FIG. 15 is a front view, and FIG. 16 is a right side view.

DETAILED DESCRIPTION OF THE PREFERRED EMBODIMENT

Referring to the drawings and initially FIGS. 1 to 6, a universally adjustable electrical fixture 10 is illustrated generally including a base assembly 11, a fixture fitting 12 universally carried by the base 11 and having a threaded fitting 14 that receives a female fitting carried by the electrical device which may for example be a lamp or light fixture, and a conductor 16 that passes through the base to provide a source of power to the connected electrical fixture.

The base 11 includes a housing member 18 that may for example contain power supply components and controls for the electrical fixture, and a one-piece base plate 19 that is attached to the housing 18 by suitable fasteners 20.

An integral generally rectangular, tapered hollow post 22 projects outwardly from base plate 19 and has a spherical ball 24 extending from an integral stand-off 25 on base post 22.

As seen more clearly in FIGS. 3 to 6, the fitting 12 has an enlarged annular portion 28 that surrounds a spheroidal socket 29 that forms with ball 24 a ball and socket connection between fitting 12 and base 11.

The ball 24 has an arcuate generally circumferential slot or recess 34 therein having a hole 35 through which conductor 16 passes, and fitting 12 has a central opening 36 which permits conductor 16 to pass through the fitting.

Figure 6:
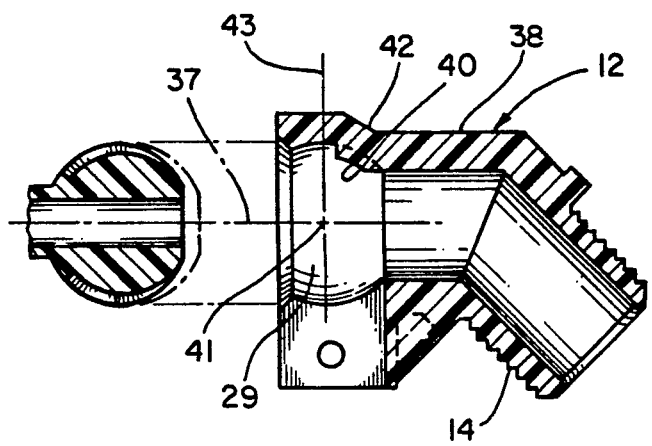
FIG. 6 is a fragmentary exploded longitudinal sectional view of the ball and socket connection illustrated in FIGS. 3, 4, and 5.

When positioned as shown in FIG. 6 with the axis 37 of fitting cylindrical portion 38 horizontal, a fitting tab 40 lies in the vertical plane of FIG. 6 and projects radially toward the point centroid 41 of socket 29 positioned on a line 42 about 30 degrees forwardly from vertical axis 43 extending vertically through the centroid of socket 29.

Figure 5:
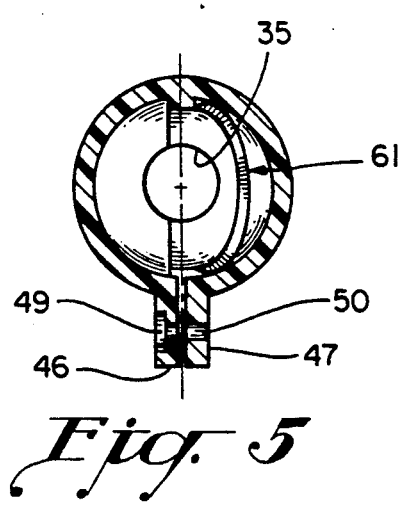
FIG. 5 is a fragmentary front view of the ball and socket connection illustrated in FIGS. 3 and 4.

As seen more clearly in FIGS. 5 and 6, the cylindrical portion 38 surrounding the spherical socket 29 is split at its lower end where spaced integral flanges 46 and 47 depend. As seen in FIG. 5, aligned openings 49 and 50 in these flanges receive a suitable fastener, not shown, that when tightened clamps the fixture 12 in any desired position on ball 24.

As seen in FIGS. 3 to 6, slot 34 is defined by a first side 52 that lies in a single vertical plane spaced slightly to one side of a vertical axis extending through the ball. The opposite side 54 of slot 34 lies in a cordal plane angularly related to side 52 so that the sides 52 and 54 are furthest apart at the axis of hole 35. This means that the sides 52 and 54 are closest together at slot ends 56 and 57 shown respectively in the top and bottom views of FIGS. 3 and 4.

The sides 52 and 54 of the slot engage the fitting tab 40 to limit movement and rotation of fitting 12 about its own axis.

Figure 1:
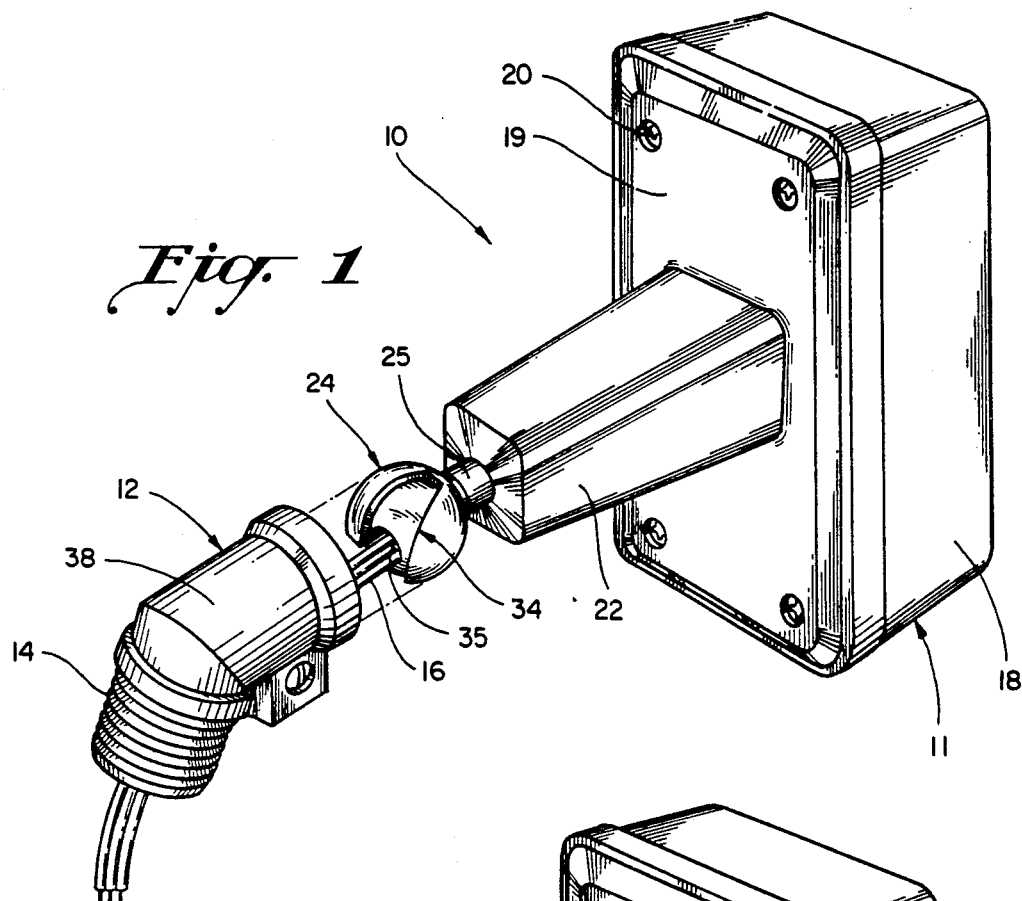
FIG. 1 is an exploded perspective of the universal electrical fixture according to the present invention.
Figure 2:
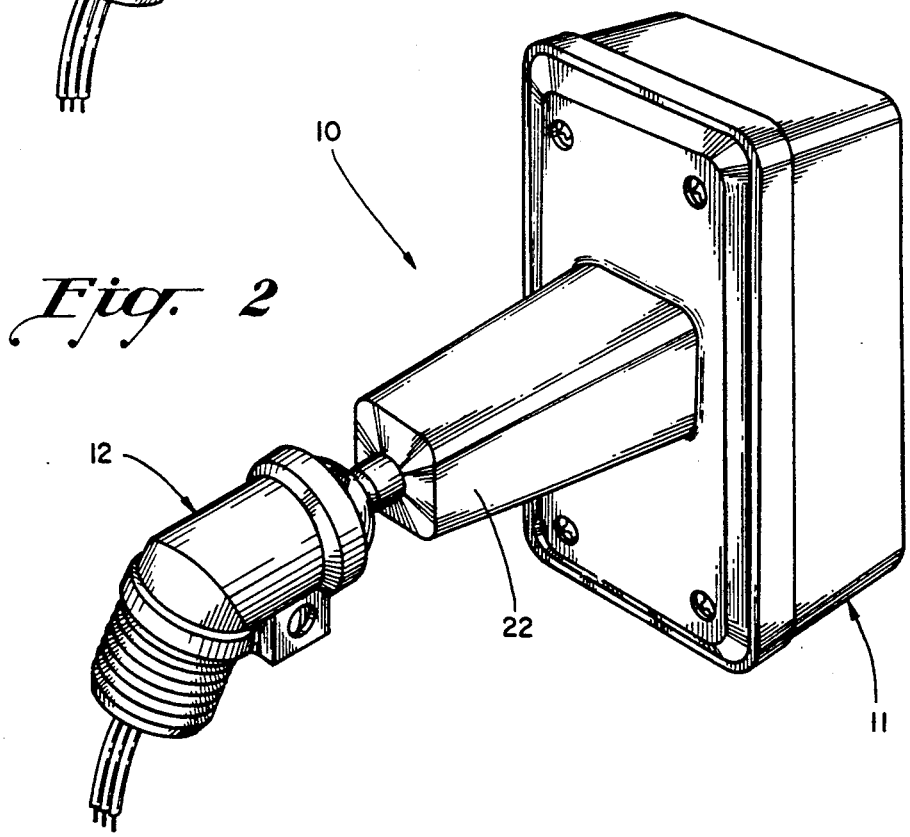
FIG. 2 is an assembled perspective similar to FIG. 1.
Figures 3, 4:
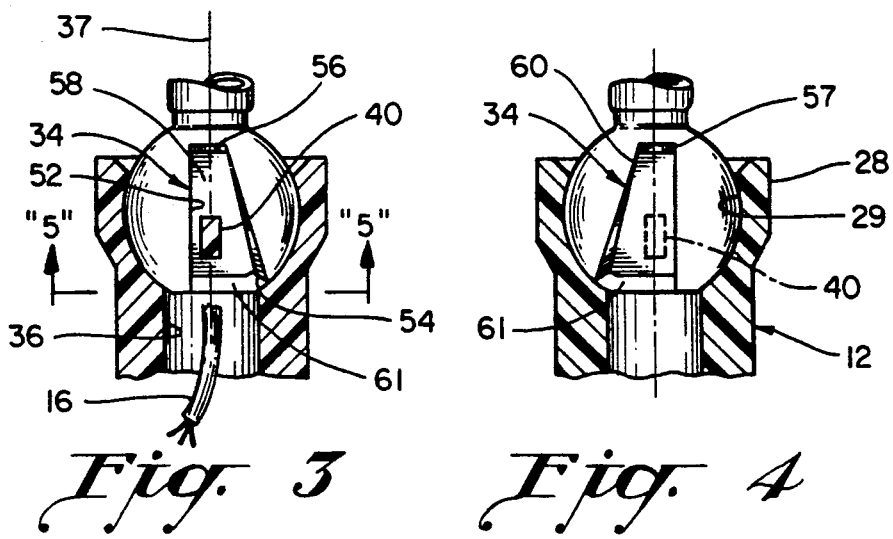
FIG. 3 is a fragmentary top view of the ball and socket connection according to the present invention.
FIG. 4 is a fragmentary bottom view of the ball

Functionally slot 34 is divided into three sections, a first narrow section 58, as seen in FIG. 3, at the top end of the slot 34, limits rotation of the fitting 34 when the fitting is pointed generally forwardly and downwardly as shown in FIG. 7, and a lower section 60 near end 57 at the bottom of ball 24 limits rotation of fitting 12 about its own axis when the fitting is directed forwardly and upwardly as generally depicted in FIG. 8.

The widest central section 61 of the slot adjacent opening 35 defines a third portion of the slot that permits the fitting to swing about its own axis, namely axis 37 from the position shown in FIG. 7 to the position shown in FIG. 8.

That is, when the user positions fitting 12 in the position of FIG. 7(also the same position depicted in FIGS. 9 to 12), the user may rotate the fitting clockwise(but not counter-clockwise) about its own axis, namely the axis 37 of fitting cylindrical portion 38, approximately 130 degrees to the position illustrated in FIG. 8 where engagement of tab 40 with slot side 52 prevents further clockwise rotation. In the FIGS. 7 and 8 positions, tab 40 rides in slot central section 61. As the fitting 12 is swiveled in any direction from the FIG. 7 position, tab 40 rides in the first and third slot sections 58 and 61 and fitting rotation is limited by adjacent walls 52 and 54. When swung in any direction from the fitting position illustrated in FIG. 8, tab 40 moves into the lower and third slot sections 60 where the other ends of the same wall 52 and 54 prevent or limit rotation of the fitting 12 about its own axis.

FIGS. 9 to 16 illustrate the manner in which the enlarged slot section 61 permits 120 degree rotation of the fitting 12 when in the positions illustrated in FIGS. 7 and 8. As noted above, when in the FIG. 7 position, the fitting 12 may be swung to any position left, right, and down but the fitting portion 14 must be generally horizontal or pointed downwardly, and from the FIG. 8 position the fitting may be swung right, left or up from the position shown. It is the central section 61 of the slot that divides movement of the fitting portion 14 into these two ranges, one generally above a horizontal plane extending through ball 24 and one generally below this horizontal plane.

In FIGS. 9 to 12, the fitting 12 is illustrated in dotted lines and depicted in the same position illustrated in FIG. 7 where rotational movement of the fitting 12 about its own axis is permitted. Note that in this position axis 37 of fitting cylindrical portion 48 is angularly related in every view and is generally directed forwardly, downwardly and to the left from the front as seen in FIG. 11.

In this position, tab 40 engages slot side 52 about 30 degrees above a horizontal axis extending through base portion 22 and ball 24 as depicted in the side view of FIG. 12 and the angular side view of FIG. 10.

In understanding the rotational movement of fitting 12 from the position illustrated in FIGS. 9 to 12 to the position illustrated in FIGS. 13 to 16, it must be understood that rotational movement of fitting 12 about its own axis means rotational movement of the fitting about axis 37 which is actually the axis of the cylindrical portion 48 of fitting 12. Both FIG. 10 and FIG. 14 are taken in a direction perpendicular to axis 37 so that rear surface 70 appears as a single line in both views.

Since in moving from the position illustrated in FIGS. 9 to 12 to the position illustrated in FIGS. 13 to 16, the fitting 12 only rotates about axis 37 without any swiveling movement, the tab 40 has pure circular movement in slot 50 about axis 37.

Viewing the front views of FIGS. 11 and 15, as fitting 12 is rotated from its FIG. 11 position, tab 40 swings away from slot side 52 in a downward arc toward slot wall 54 just grazing slot wall 54 at point 72, the widest part of slot portion 61 and then swings along a similar arc downwardly and to the left until it again engages slot side 52, but at the lower part of central slot section 61.

From the position of fitting 12 illustrated in FIGS. 13 to 16, the threaded fitting portion 14 may be swiveled in any direction from straight forward, to the right or left, and in all other positions upwardly from a generally horizontal plane extending through the centroid of ball 24. In that range of movement, tab 40 rides in the lower part of slot central section 61 and slot second or lower section 60. When tab 40 nears the narrow end of slot section 60 almost all rotational movement of fitting 12 about its own axis is prevented and as tab 40 moves into larger third slot section 61 in the upper range, the fitting has a greater range of rotational motion about its axis but limited to about 20 degrees.

The fitting 12 can be repositioned from its upper range of movement illustrated in FIG. 13 et al. to its lower range of movement illustrated in FIGS. 9 to 12 by again placing the fitting in its position shown in FIGS. 8 and 13 to 16, where it is rotated with pure rotational motion about its own axis 37 counter-clockwise to the position illustrated in FIGS. 7 and 9 to 12. From that position of the fitting 12, the threaded portion 14 may be swiveled in any direction from straight forward, to the right, or left, or in any other position downwardly from the generally horizontal planes extending through the centroid of ball 24. In this range, tab 40 rides in first slot section 58 and in the upper part of the central slot section 61 and as it is pivoted upwardly, tab 40 moves to the narrowest part of slot 34 where practically all rotational movement of fitting 12 about axis 37 is prevented, and when pivoted downwardly tab 40 moves into the third slot section 61 where about 20 degrees of rotational movement of fitting 12 is permitted, except of course in the FIG. 7 position where about 120 degrees of rotation is permitted.

What is claimed is:

1. A universally adjustable electrical fixture capable of rotational motion and swiveling movement in any direction without rotation, comprising: a base having an axis with an opening therethrough for receiving electrical conductors, an electrical fixture fitting universally mounted on the base hand having an opening therethrough for receiving the electrical conductors, means for mounting the fixture fitting on the base for rotational motion about a predetermined axis and for swiveling movement in a plurality of directions generally perpendicular to the axis without requiring rotational motion to permit swiveling in another direction, means for limiting rotation of the fitting about the predetermined axis to less than 360 degrees to minimize twisting of the electrical conductors, the means for mounting the fixture fitting on the base including a socket on one of the base and fitting and a ball on the other, an arcuate slot in the periphery of the ball and a tab projecting inwardly from the spheroidal surface of the socket projecting into the slot that engages the sides of the slot to limit rotational movement of the fixture fitting about its own axis to less than 360 degrees, said slot having portions substantially wider than the tab to permit the swiveling motion of the fixture fitting without first rotating the fixture fitting about the predetermined axis.

2. A universally adjustable electrical fixture as defined in claim 1, wherein the slot has an arcuate length on the ball greater than 180 degrees.

3. A universally adjustable electrical fixture, comprising: a base having an opening therethrough for receiving an electrical conductor, an electrical fixture fitting universally mounted on the base and having an axis and an opening therethrough for receiving the conductor, a ball carried by one of the base and fixture and a socket receiving the ball on the other to accommodate the universal movement, said ball and socket having openings therethrough for receiving the conductor, a tab projecting from the socket and a tab receiving slot on the ball, said slot having a first section preventing rotation of the fitting about its own axis but permitting its swinging motion by engaging the tab when the fitting is on one side of a plane extending through the ball, said slot having a second section which is a mirror image of the first section and generally diametrally opposite the first section on the ball for preventing rotation of the fitting about its own axis but permitting its swinging motion on the other side of the plane, said slot having a third enlarged section intermediate with the first and second slot sections engageable with the tab that permits rotation of the fixture fitting about its own axis so the tab can swing from the first slot portion to the second slot portion.

4. A universally adjustable electrical fixture as defined in claim 7, wherein the ball slot has a first side having a flat surface and a second side angularly related to the first side and positioned so the sides are furthest apart at the opening in the ball and closest together at the ends of the slot, said third section of the slot being at the opening in the ball and said first and second sections of the slot being at the ends of the slot.

5. A universally adjustable electrical fixture, comprising: a base having an opening therethrough for receiving an electrical conductor, an electrical fixture fitting universally mounted on the base and having an opening therethrough for receiving the conductor, including means for mounting the fixture fitting on the base for rotational motion about a predetermined axis and for swiveling movement in a plurality of directions generally perpendicular to the axis without requiring rotational motion to permit swiveling in another direction, a ball carried by one of the base and fixture fitting and a socket receiving the ball on the other to accommodate the universal movement, said ball and socket having openings therethrough for receiving the conductor, an integral tab projecting from the spheroidal surface of the socket, an arcuate slot in the periphery of the ball extending in a diametral plane through the ball substantially over 180 degrees and having a width approximately at its midpoint substantially greater than the width of the tab to permit substantial rotation of the fixture fitting about the predetermined axis while limiting rotation about the predetermined axis to less than about 180 degrees, said slot having a narrow width adjacent its ends but still wider than the tab to permit swiveling motion in many directions without requiring any preliminary rotation of the fitting about said predetermined axis.

* * * * *